Sept. 2, 1941. K. BRATRING 2,254,262
METHOD OF AND APPARATUS FOR PRODUCING HOLLOW BODIES
Filed Oct. 12, 1938   5 Sheets-Sheet 1

Inventor:
Kurt Bratring

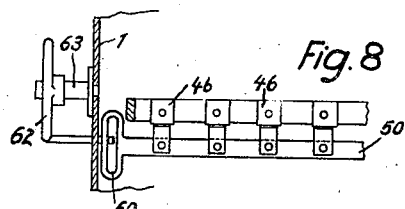
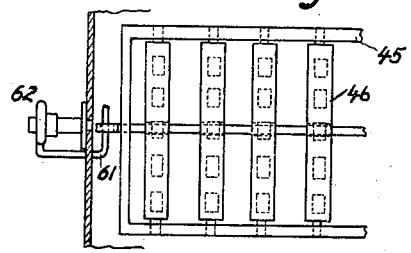
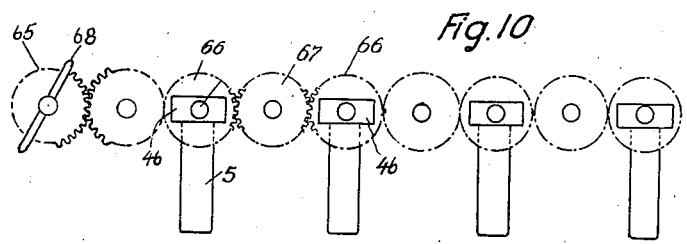
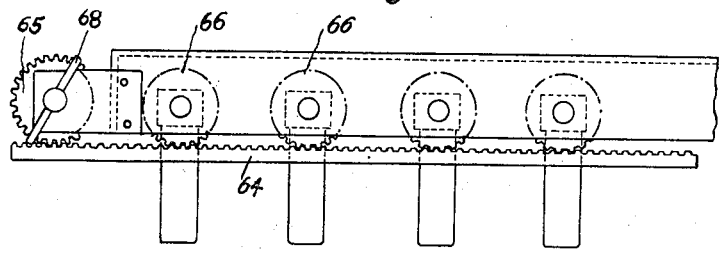

Patented Sept. 2, 1941

2,254,262

UNITED STATES PATENT OFFICE 2,254,262

METHOD OF AND APPARATUS FOR PRODUCING HOLLOW BODIES

Kurt Bratring, Dahlem, Berlin, Germany, assignor to Neocell Products Corporation, a corporation of Delaware Application October 12, 1938, Serial No. 234,619
In Germany May 13, 1936

9 Claims. (Cl. 18—24)

My invention comprises a method of and apparatus for producing hollow bodies by the well-known process of dipping molds in solutions or suspensions; it is of particular value when the bodies are made of cellulose derivatives or similar substances.

In such work it has been found that there is a tendency, particularly when the bodies to be formed have flat or concave lower ends or faces, to form and entrap bubbles of air during the dipping process, and that these bubbles are apt to enter into the substance of the formed body, thereby impairing its appearance, and may even result in structural weakness, or in openings which will cause the bodies in question to leak.

To minimize this difficulty it has been proposed to take various precautions to deaerate the liquid in the dipping bath, as for example from time to time heating the bath to drive out the air which it contains, the quantity of which tends constantly to be increased by the dipping operation. This deaerating operation interrupts the production, improves conditions only for a short time, and involves driving out some of the solvent, thereby necessitating the addition of more solvent to bring the bath back to the proper consistency.

In my prior application Ser. No. 218,327, filed July 9, 1938, I have disclosed a process, involving certain temperature relations therein fully described, by which I am able greatly to reduce the tendency to the formation of air bubbles in the formed bodies.

When, however, it is necessary, as it is in large-scale production, to dip a great number of molds at once into the dipping bath, it is highly desirable, even with the use of my invention above described, to reduce to a minimum the amount of air carried into the bath by the molds; in the case above referred to, in which the formed bodies are flat or concave on their lower surfaces, as might be the case for example if the formed body were a drinking cup, it is often possible, even with the use of my former invention, for large bubbles of air to form on these lower surfaces during the dipping operation, and for these bubbles to remain in the finished body.

It has already been proposed in various dipping processes to cause the molds to pass through the bath, as by a rotary motion, in such manner that as the mold enters the bath it is inclined at a rather flat angle, so that one side of one edge of the lower portion of the mold is dipped first, then as the mold continues to enter the bath it becomes more and more vertical, finally passes through the vertical and emerges from the bath in such a way that the contact between the dipping solution and the mold is broken at one side of one edge of the mold. Helpful as this expedient may be in the case, for example, of dipping molds one at a time, I have found that if it be resorted to when a large number of molds mounted in a rack are dipped simultaneously—and particularly if, as is necessary for economy of production, the molds are placed rather close together—the action of the great number of molds passing through the solution in the manner above described causes very considerable turbulence in the dipping bath, and introduces large quantities of air into the dipping solution, unless the operation is carried on so very slowly as greatly to reduce the daily output of the plant.

This matter becomes particularly important in connection with the manufacture of hollow bodies from cellulose acetate and other cellulose derivatives and other transparent or translucent substances, where even small air bubbles in the final product are conspicuous, and where the time required in the dipping and drying operations is considerable, so that in order to achieve a rapid large-scale production it is necessary to dip a very large number of molds in each operation.

In accordance with my invention I avoid the difficulties above set forth by the use of two separate sets of movements during the dipping operation; a set of movements whereby the end of the mold is introduced into and removed from the bath at a rather flat angle with respect to the vertical and at an angle to the central axis of the mold, and a set of movements, one of immersion and one of partial withdrawal, which, because they are approximately in the direction of the axis of the mold, create very little turbulence.

With a mold of any usual shape, the best way to carry out the procedure just described is to cause the tip of the mold to enter the solution by a movement in the nature of a rotation or tilting, whereby the end of the mold is introduced without splashing, and there is no tendency for bubbles to be entrapped at that point. Such movement, however, since it involves pushing the mold through the liquid in such a way as to displace the liquid rapidly, should be interrupted as soon as its object is achieved. The mold should then be brought to the proper angle for the final step of the dipping operation, which will normally be an approximately vertical position, still without introducing it very far into the solution; then the mold should be dipped fully into the solution; that is to say far enough to produce the desired body; by pushing it endwise into the solution, a step which involves a minimum of disturbance of the liquid. The mold should be withdrawn by an endwise motion, the reverse of the motion just described, that is to say a motion approximately parallel to the central axis of the mold, but so that the end of the mold still dips into the liquid. Withdrawal should then be completed by a tilting or rotary motion, similar to the motion by which the end of the mold was first dipped into the bath.

In this manner, in the case of molds of ordinary shapes, I am able to carry on the dipping operation with a minimum of turbulence and splashing and with a minimum formation of air bubbles.

The cheapest and most efficient manner to cause the motion described above is to give a tilting or rotary motion to the frame or support on which the molds are mounted, and then, when the time comes for the second step in the operation, to vary the distance between the mold and the dipping bath, as for example by lifting the bath by a plunger the proper distance to complete the immersion.

When, however, I have occasion to dip simultaneously a large number of molds adapted to the formation of bodies of considerable length as compared to their diameter, I find it impossible by the process thus far described to cause all of the molds to enter the dipping bath above described without causing some of them to enter so far into the bath as to produce a certain amount of turbulence and to trap a certain amount of air. In such cases I produce the tilting or rotary motion by connecting the molds to the dipping frame in such manner that each mold may be tilted separately, which overcomes the difficulty just mentioned.

My present invention is independent of the invention of my former application above referred to in the sense that either invention may be used without the other. But for best results I prefer to use them together.

The movements of the molds and the dipping methods outlined above may be carried out in various ways. The accompanying drawings show apparatus which I have found to be suitable and practical for the purpose.

In these drawings:

Fig. 8 shows a part of an apparatus embodying a further modification.

Fig. 9 is a plan view of the apparatus of Fig. 8.

Figs. 10 and 11 show diagrammatically portions of two further modifications of apparatus for tilting the molds.

Figure 1:
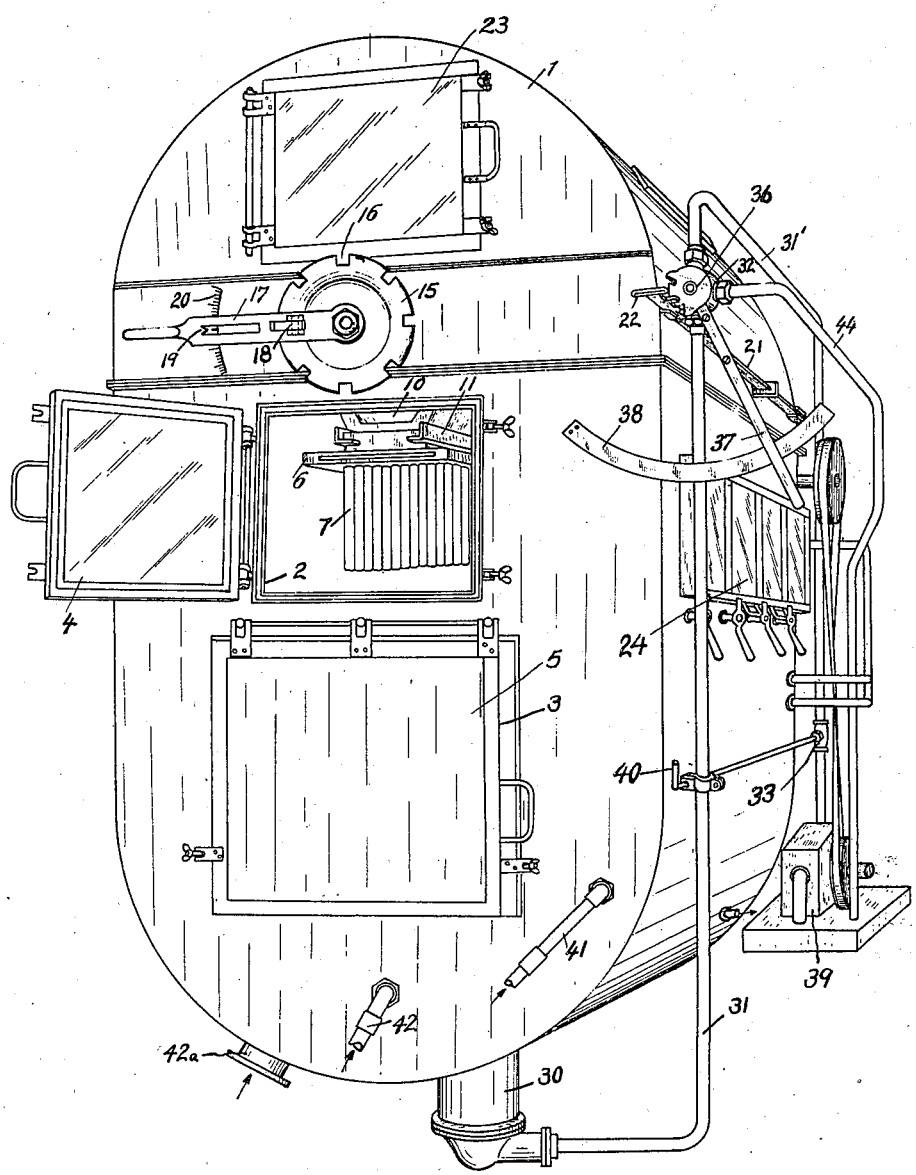
Fig. 1 is a view in perspective of a complete apparatus for carrying out the invention in one way, showing molds on a mold frame attached to a rotary mold support.

Referring now to Fig. 1, 1 is a gastight sheet metal casing, mounted on an internal rigid structure which may conveniently be a frame work of angle irons. The casing 1 is preferably rigidly attached only to the base of this structure and elsewhere attached thereto in vibration-insulated fashion only. This mode of attachment constitutes the subject matter of a co-pending application of myself and Albert Boecler, Serial No. 218,323, filed July 9, 1938, and forms no part of the subject matter of this application, although it may with advantage be used in connection therewith. In accordance with the disclosure of that application, I prefer to mount all moving parts hereinafter referred to on the rigid structure, rather than on the casing itself. However, to avoid undue complication of the drawings of this application I show such parts mounted directly on the casing.

On the front of the casing 1 there are two openings or doorways 2, 3, which may be tightly closed by doors 4, 5. Like doorways and doors are placed at the rear of the casing. These doorways serve respectively as passages for the introduction and removal of the mold frames 6 with their attached molds 7, and for the introduction and removal of the immersion vessel 8, shown in Figs. 2 and 3.

Inside the casing 1 a shaft 9 (Figs. 2 and 3) extends throughout the length of the casing and through its end walls. A rotary mold support 10 is mounted on the shaft 9 inside of the casing. The support 10 is provided at its periphery with a number of slideways 11 into which the mold supports 6, bearing the molds 7, may conveniently be fitted. The shaft 9, arranged to turn in bearings 12, bears at its rear end extension a clutch 13 and worm drive 14, through which the support 10 may be coupled to and driven by any suitable power source when the clutch 13 is engaged, whereas when the clutch 13 is disengaged the worm drive 14 may continue to rotate without rotating the support 10.

On the front end extension of the shaft 9 there is rigidly mounted a wheel 15 having peripheral notches 16 corresponding in number and position to the mold frame 6. A lever 17, rotatably mounted on the same extension of the shaft 9, bears a pawl 18 which may be engaged with any one of the notches 16. The lever 17 also bears a pointer 19 which registers with the divisions of a scale 20 on the front of the casing 1. By this construction it is possible manually to control the angular position of the molds during the dipping operation with great accuracy.

For operation of the clutch 13 from the front of the apparatus, there is provided outside of the casing a rod 21 terminating in a handle 22 and having certain notches cut in it for a purpose later to be described.

The casing is also supplied with observation windows 23 on either end and with observation windows 24 on either side. These observation windows, which are normally closed in gastight fashion, may be opened for cleaning and the like.

Inside the casing and at the lower portion thereof is an immersion vessel 8 (Figs. 2 and 3) provided with rollers 25 adapted to move on rails 26 mounted on the rigid framework. This vessel 8 is adapted to contain the dissolved film-forming substance to be used in the immersion process. The vessel when in working position stands inside a secondary chamber 27 (Fig. 2) which is normally covered by a two-part cover 28, 29. For economy of space and materials it is preferable to construct the chamber 27 and the covers 28, 29, and associated mechanism in accordance with the disclosure of co-pending application Serial No. 218,324, of myself and Albert Boecler, filed July 9, 1938.

For immersion of the molds, the vessel 8 is arranged to be lifted and lowered by a hydraulic lifting device 30 (Fig. 2) provided at the bottom of the chamber 27. Liquid under pressure is conveyed to the cylinder of this device through the pipes 31, 31', and the valves 32 and 33. By means of the lever arms 34, the covers 28, 29, are preferably arranged to be automatically removed upon lifting of the vessel 8 by the hydraulic lifting device 30 and upon such removal to slide laterally in guideways 35, all in accordance with the disclosure of application Serial No. 218,324 hereinabove referred to.

The valve 32 is provided with a locking disc 36 (Figs. 1 and 2) operable by a lever 37 arranged to swing over a scale 38. The notches in the locking disc 36 are arranged as shown in Fig. 1 to cooperate with the notches in the rod 21 to prevent actuation of the rod 21 and therefore of the clutch 13 when the vessel is in its raised position and at the same time to permit of raising the vessel only when the clutch 13 is disengaged.

The necessary liquid is supplied to the hydraulic device 30 by a pump 39 located outside of the casing 1 and conveyed thereto through a valve 33, manually controlled by a handle 40, and also through the valve 32. The valve 33 is a fine adjustment valve to permit of exact adjustment of the vertical position of the immersion vessel in order to produce immersion of the molds to just the extent desired.

As fully disclosed in the joint applications herein-above referred to, I prefer to provide heating coils 41 and cooling coils 42 within the casing 1 and in the neighborhood of the chamber 27. These heating and cooling coils assist in the circulation of air within the casing and in the condensation of solvent which evaporates from the films of plastic substance on the molds after dipping. Condensed solvent may be withdrawn through an outlet 43 at the bottom of the apparatus (Fig. 3) and used anew. Air may be supplied to the casing through an inlet 42a at the bottom and withdrawn at the top through an outlet 42b.

Figure 2:
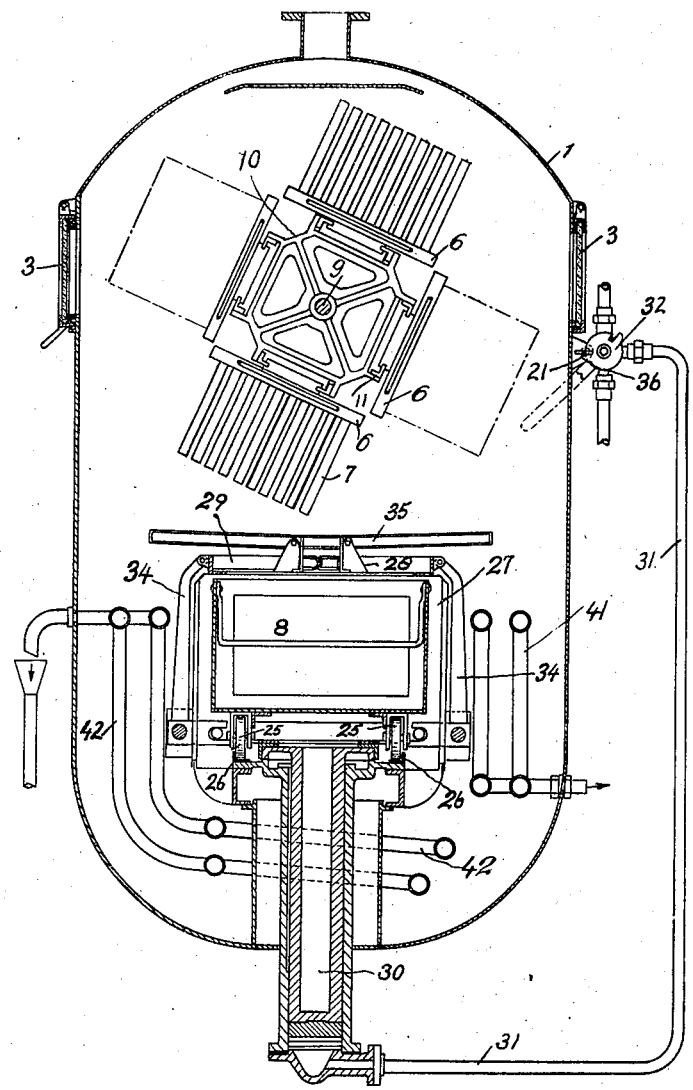
Fig. 2 is a cross section through the apparatus of Fig. 1, showing the molds in tilted position.
Figure 3:
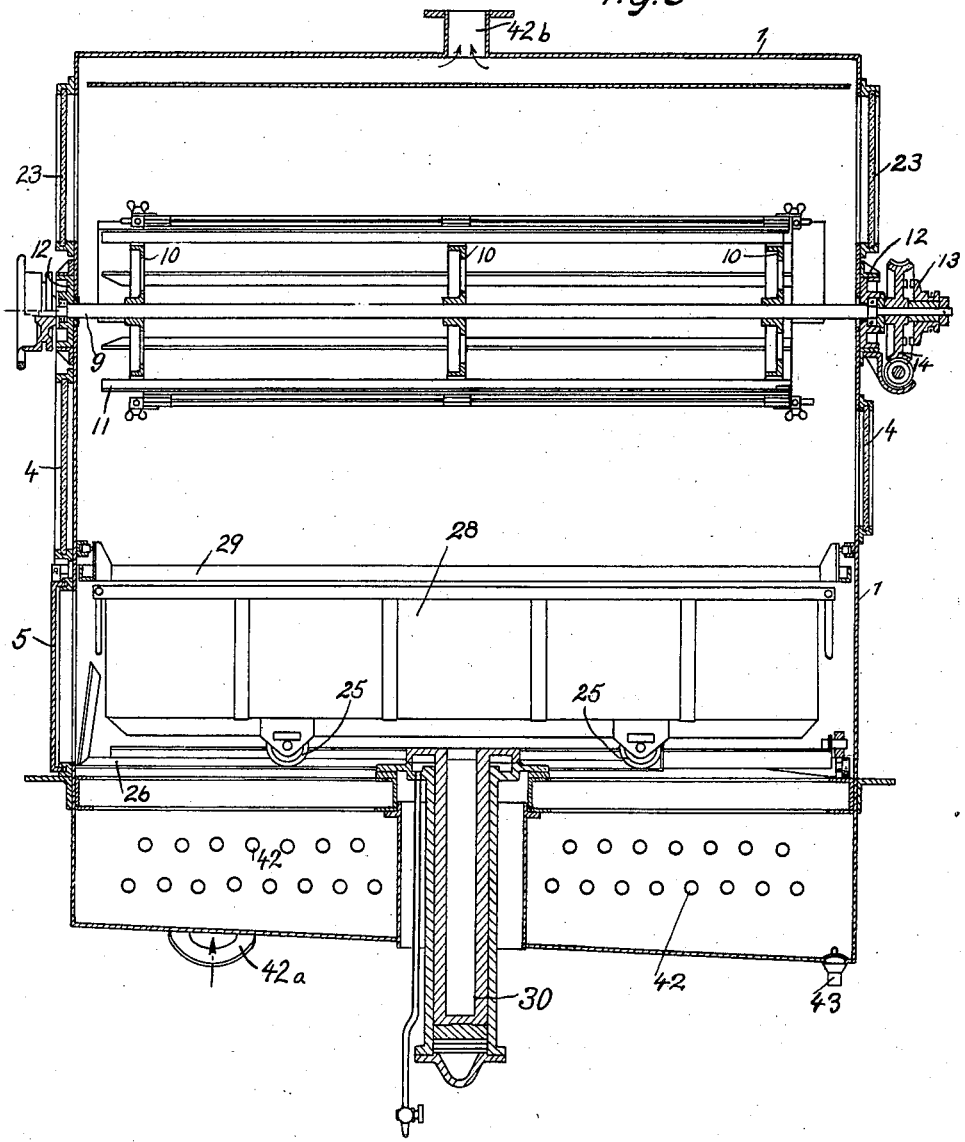
Fig. 3 is a longitudinal section through the apparatus of Fig. 1, showing the rotary mold support and the immersion vessel, but omitting molds and mold frame.

In carrying out my novel immersion process with the apparatus shown in Figs. 1 to 3 I proceed as follows:

The rotary support 10 being supplied with mold frames in the slideways 11, and the clutch 13 being in engagement, the support 10 is rotated through the worm drive 14 until one mold frame is directly above the vessel 8. The clutch is then disengaged by actuation of the clutch rod 21 and, the index 19 of the lever 17 being in the approximate center of the scale 20, the pawl 18 is dropped into the nearest notch 16 of the wheel 15.

The lever 37 is now moved to open the valve 32, admitting liquid to the hydraulic cylinder 30, lifting the vessel 8 toward the molds and removing the covers. At the same time the lever 17 is moved away from the zero of the scale 20 to some point nearer to one end of the scale. Just what point this is depends on the shape of the desired hollow article, especially the degree of convexity and the area of its base; but it should in any event be such that all parts of the base of each mold slope in the same direction with respect to the surface of the liquid in the vessel 8.

The lever 17, and therefore the molds 7, are maintained in this position until the base of the last mold has fully penetrated the surface of the liquid in the rising vessel, whereupon the handle is immediately and carefully moved to the scale zero, thus placing the molds in vertical position. This movement should take place as early as may be in order that the arcuate motion of the molds through the liquid stir it up as little as possible; but it should not commence until after the last mold has penetrated the liquid surface, else air might be entrapped at the base of one or more molds.

The molds are now held precisely in vertical position until the vessel has been lifted to the proper height, correct adjustment of the liquid level being accomplished by the fine adjustment valve 33. In a given dipping operation it is of course usual for all the molds on a single frame to be alike with a view to the production of like hollow articles; with the same end in view, it is desirable that the molds be immersed all to the same depth. This requires precise adjustment of the verticality of the molds, which is accomplished by carefully holding the index 19 at the zero of the scale 20 while the liquid level approaches, reaches and recedes from its highest level.

The hydraulic device 30 is next lowered by reversing the valve 32 and discharging the liquid through the pipe 44. As the level of the film-forming bath about the molds falls, the latter are carefully held in vertical position until shortly before the bottoms of the molds emerge from the surface. The lever 17 is now swung over the scale 20, preferably in a direction opposite to the original direction, in time to permit the earliest emerging mold to emerge with its base at a considerable angle to the horizontal. Bringing the bases out at an angle results in substantial reduction of the amount of solution hanging from the lowest point of each mold in the form of a drop, since far less liquid can cling to an edge than to a horizontal surface. Furthermore, the molds are withdrawn through the liquid surface with extreme care and slowly, in order that as much as possible of this excess material clinging to the molds may flow back into the bath before contact with the surface of the bath is actually broken. This results in avoiding splashes which tend to entrain air into the bath and on the rebound attach it to the film with resulting injury to the finished product.

The angle or tilt of the molds on withdrawal from the bath is preferably opposite to their angle on entrance. Thus if, for example, the index 19 is held at the upper part of the scale 20 during submergence, it is held at the lower part during emergence. This is in order that all molds shall have been submerged for the same length of time, independent of their positions in the frame 6.

The above-described operations, and the position and condition of the molds during the tilting and immersion process may be observed through the windows 23, 5, 6.

When a large number of molds, particularly somewhat long ones, are attached to each frame, the tilting motions above described inevitably result in a considerable lateral movement of each mold through the dipping bath. In order to minimize such lateral movements I have devised novel mold frames on which the molds may be pivotally mounted in rows, to undergo the tilting movements without movement of the support 10. Several different mechanisms for effecting this individual tilting of the rows of molds are illustrated in Figs. 4 to 11.

Figure 4:
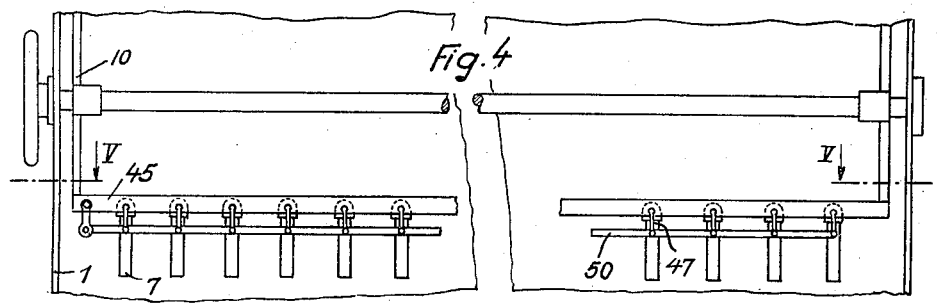
Fig. 4 is a part longitudinal section through apparatus in which the molds are pivotally attached to the rotary support.
Figure 5:
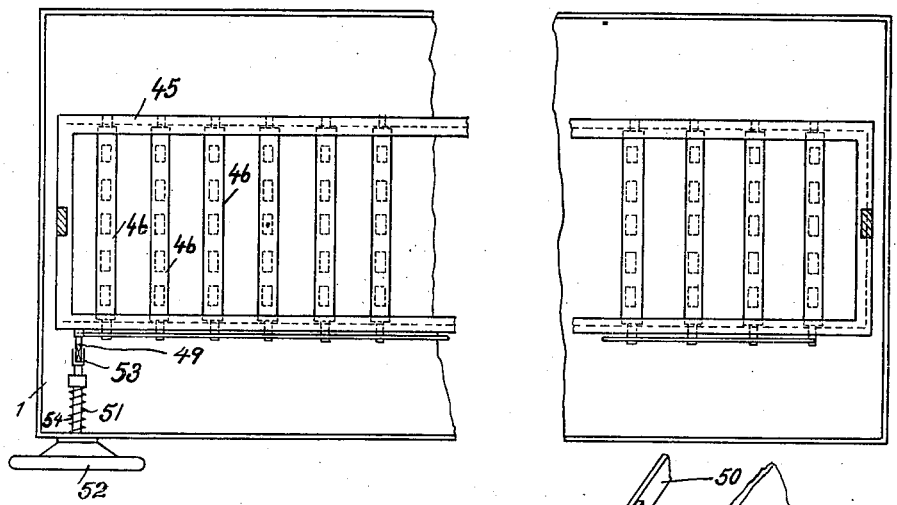
Fig. 5 is a section through the apparatus of Fig. 4 on the line V—V.
Figure 6:
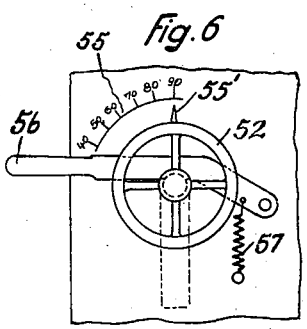
Fig. 6 is a detailed view of portions of the apparatus of Figs. 4 and 5.

Referring now to Figs. 4 and 5, the lowermost mold frame is shown mounted on the support 10 by means of the slideways 11. The mold frame consists of a pair of axial bars or strips 45 and a number of transverse strips 46, on each of which is mounted a single row of molds 7. The strips 46 are mounted to rock about their longitudinal axes in the frame 45, a stud continuation of each bar extending through a hole in the frame 45 and being provided with a short connecting rod 47 which, in the position shown, extends downward. Another connecting rod 48 extends downward from a square end stud 49 rotatably mounted in the frame 45 at the level of the strips 46, and these connecting rods 47, 48 are all joined together by coupling rod 50, in such manner that when the stud 49 is rotated, each of the strips 46 and the row of molds attached to it is individually rocked. For rotating the stud 49, a shaft 51 extends through the casing wall, terminating at its outer end in a handwheel 52 and at its inner end in a squared socket 53. The shaft 51 is normally urged out of engagement with the stud 49 by spring 54 to permit removal of the frame 45 from the support 10, and the socket 53 may be engaged with the squared end of the stud by manually pushing it inward against the force of the spring 54. By this engagement the strips 46 and attached molds may be individually rocked or tilted as desired by manipulation of the handwheel 52. This handwheel 52 is provided (Fig. 6) with an index 55' which coacts with a scale 55 on the outside of the casing 1 for indicating the angular position of the molds in the course of immersion. A lever 56 is pressed against the outer extension of the shaft 51 by a spring 57 with sufficient force to hold the molds in any desired position by its friction. If desired, the shaft extension may be provided with notches and the lever 56 with a pawl for holding the molds in position more positively.

Operation of the apparatus takes place exactly as above described in connection with Figs. 1 to 3 inclusive, with the exception that the wheel 52 is manipulated instead of the lever 17. From the construction of Figs. 4 and 5 it will be evident that the molds can be given a very considerable angle of tilt without the necessity of moving them far through the bath to bring them to the vertical and without danger of completely submerging the first mold to enter the bath before the last one has touched the surface.

It will be observed that the scale 55 is only graduated for tilts on one side of the vertical. Since in this construction corresponding points of all molds are always at the same level, there is no advantage in sloping them one way for submergence and the other way for emergence.

Figure 7:
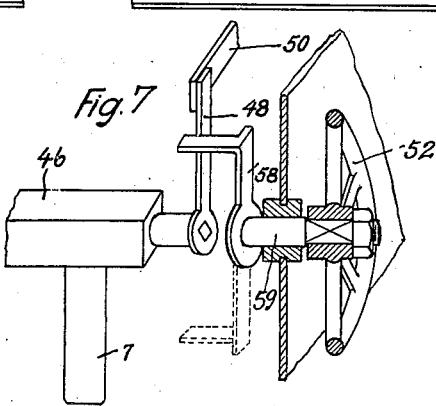
Fig. 7 is a view in perspective of modified apparatus for tilting the molds.

Fig. 7 shows a modified form of coupling between the handwheel 52 and the connecting and coupling rods 48, 50, 47, which has the advantage that the handwheel 52 may be disengaged from the shaft 41 to permit removal and replacement of mold frames merely by an angular movement instead of an axial movement. In this construction an angle piece 58 is keyed onto the shaft 59. In the position shown by full lines it presses against the connecting rod 48, but in that position shown by dotted lines it is out of engagement therewith and entirely out of the way of the frames 45 and all associated mechanism, which may then be removed from the casing without impediment.

In case it is desired to operate the above-described mold-tilting mechanism from the front of the casing 1 instead of from the side, the arrangement of Figs. 8 and 9 may be employed. In this case the coupling rod 50 hangs below the centers of the strips 46 instead of below their ends, connecting rods being provided as in Fig. 4. The coupling rod terminates in an enlarged portion having a vertical slot 60 cut in it, and an angle member 61 similar to the member 58 of Fig. 7 extends through the casing wall to engage the slot 60. The outer end of this member 61 is attached eccentrically to a handwheel 62, rotatably and slidably mounted on a stud 63 mounted on the framework. Rotation of the wheel 62 engages and disengages the coupling while sliding it on the stud 63 operates to tilt the molds.

Still further means for individually tilting the molds are shown in Figs. 10 and 11. In the construction of Fig. 11 the coupling rods 47 are replaced by gears 66 at the ends of the strips 46 which mesh with a rack-toothed rod 64 replacing the plain coupling rod 50 and driven by a drive gear 65 and handle 68. In Fig. 10 the rack has itself been eliminated, the tilting movements being transmitted from each strip 46 to the next through idler gears 67.

It will be apparent that in all of the constructions of Figs. 4 to 11, the mold support 10 may if desired be replaced by some other form of carrier, such as a conveyor belt, traversing immersion apparatus of suitable form by intermittent steps.

I claim:

1. The method of manipulating a mold in an operation involving dipping the same in a bath, which consists in introducing the end of the mold into the bath by a movement at an angle to the axis of the mold, completing the dipping by a movement along said axis, partially withdrawing the mold by a reverse motion along said axis, and completing the withdrawal by a movement at a considerable angle to said axis.

2. In a method of producing hollow bodies by simultaneously dipping a number of molds in a dipping bath, the sequence of steps which comprises causing the ends of the molds to enter the dipping bath with their axes at an angle to the vertical, then bringing the molds to the angle proper for the completion of the dipping operation, causing relative movement of the mold support and the dipping bath to produce the immersion of the molds to a desired depth, then reversing the last mentioned operation until the molds are largely withdrawn from the bath, and thereafter causing the ends of the molds to emerge from the bath with their axes at a considerable angle to the vertical.

3. In a method of producing hollow bodies by simultaneously dipping a number of molds in a dipping bath, the sequence of steps which comprises tilting the molds away from their normal vertical orientation, dipping the ends of the molds into the bath, restoring the molds to their normal vertical orientation, immersing the molds in the dipping solution to the desired extent, partially withdrawing the molds, again tilting the molds away from said vertical orientation, and withdrawing the molds from the bath.

4. Apparatus for the production of bubble-free hollow articles by immersion of molds in a bath of a film-forming substance, which comprises a closed gastight casing, an immersion bath and a mold support within said casing, said support being arranged to carry a plurality of mold frames, each bearing a plurality of molds, means for bringing each of said frames successively into position for immersion in said bath, means for controllably tilting, with respect to each frame molds on such frame, in a manner to commence immersion of said molds obliquely and means for varying the distance between the frames and the immersion bath.

5. In apparatus for the production of hollow articles by immersion of molds in a bath of film-forming substance, means providing a casing enclosing said bath, means for varying and controlling the angles at which the molds are immersed, said last mentioned means comprising a supporting frame, a plurality of mold-supporting strips mounted to rotate about their longitudinal axes in said frame, and a coupling rod eccentrically linked to all of said strips, and means mechanically associated with said coupling rod and extending through said casing and operable from outside said casing for axially shifting said coupling rod as desired.

6. In apparatus for the production of hollow articles by immersion of molds in a bath of a film-forming substance, a substantially gas tight casing surrounding said bath, means positioned within said casing for varying and controlling the angles at which the molds are immersed, said last mentioned means comprising a supporting frame, a plurality of mold-supporting strips mounted to rotate about their longitudinal axes in said frame, a connecting rod attached to each of said strips, and a coupling rod linking with all of said connecting rods, and means mechanically connected to the means for varying the angles at which the molds are immersed and extending through said casing and operable from outside said casing for axially shifting said coupling rod as desired.

7. In apparatus for the production of hollow articles by immersion of molds in a bath of a film-forming substance, means for varying and controlling the angles at which the molds are immersed, said means comprising a supporting frame, a plurality of mold-supporting strips mounted to rotate about their longitudinal axes in said frame, a connecting rod attached to each of said strips, a coupling rod linking with all of said connecting rods, and a square end stud rotatably mounted on said frame and linked with said coupling rod, means providing a casing enclosing said bath and the said means for varying the angles at which the molds are immersed in said bath, a shaft extending through the said casing, provided on its inner end with a squared socket adapted to engage said stud, a spring arranged to urge said shaft out of engagement with said stud, a handwheel positioned externally of said casing and keyed to the outer end of said shaft, a scale positioned externally of said casing, and an index on said handwheel adapted to swing over said scale when said handwheel is rotated.

8. In apparatus for the production of hollow articles by immersion of molds in a bath of a film-forming substance, means for varying and controlling the angles at which the molds are immersed, said means comprising a supporting frame, a plurality of mold-supporting strips mounted to rotate about their longitudinal axes in said frame, a connecting rod attached to each of said strips, and a coupling rod linking with all of said connecting rods, a substantially gastight casing enclosing said bath and the said means for varying the angles at which the molds are immersed in said bath, a shaft extending through said casing, provided at its inner end with an angle piece adapted to engage one of said connecting rods when in a certain position and to be disengaged therefrom by rotation of said shaft through approximately one half revolution, a handwheel keyed to the outer end of said shaft externally of said casing, a scale on the outer wall of said casing, and an index on said handwheel adapted to swing over said scale when said handwheel is rotated.

9. In apparatus for the production of hollow articles by immersion of molds in a bath of a film-forming substance, means for varying and controlling the angles at which the molds are immersed, said means comprising a supporting frame, a plurality of mold-supporting strips mounted to rotate about their longitudinal axes in said frame, a connecting rod attached to each of said strips, and a coupling rod linking with all of said connecting rods, said coupling rod terminating in an enlarged portion having a substantially vertical slot therein, a casing enclosing said bath and the said means for varying the angles at which the molds are immersed in said bath, a shaft extending through said casing and having a hook at the inner end thereof, and means outside of said casing for operating said shaft to engage said hook in said slot and rock said strips to a desired angle.

KURT BRATRING.